(12) United States Patent
Lim et al.

(10) Patent No.: US 9,568,379 B2
(45) Date of Patent: Feb. 14, 2017

(54) APPARATUS AND METHOD FOR MEASURING TACTILE INFORMATION

(71) Applicants: SAMSUNG ELECTRONICS CO., LTD., Suwon-si (KR); INDUSTRY-ACADEMIC COOPERATION FOUNDATION, YONSEI UNIVERSITY, Seoul (KR)

(72) Inventors: Soo-Chul Lim, Seoul (KR); Jong Baeg Kim, Goyang-si (KR); Joon Ah Park, Seoul (KR); Soon Jae Pyo, Chungju-si (KR); Min Ook Kim, Daejeon (KR); Jae Ik Lee, Goyang-si (KR); Tae Young Chung, Seoul (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 389 days.

(21) Appl. No.: 14/075,426

(22) Filed: Nov. 8, 2013

(65) Prior Publication Data
US 2014/0260675 A1    Sep. 18, 2014

(30) Foreign Application Priority Data
Mar. 18, 2013    (KR) .......................... 10-2013-0028396

(51) Int. Cl.
| | |
|---|---|
| *G01L 5/10* | (2006.01) |
| *G01L 1/14* | (2006.01) |
| *G01L 1/20* | (2006.01) |
| *G01L 5/16* | (2006.01) |

(52) U.S. Cl.
CPC ................. *G01L 1/14* (2013.01); *G01L 1/205* (2013.01); *G01L 5/161* (2013.01); *G01L 5/165* (2013.01); *Y10T 29/49103* (2015.01)

(58) Field of Classification Search
CPC ..................................... G01L 1/18; G01L 5/10
USPC ..................................................... 73/862.041
See application file for complete search history.

(56) References Cited

U.S. PATENT DOCUMENTS

| | | | | |
|---|---|---|---|---|
| 7,609,178 | B2* | 10/2009 | Son ......................... | G06F 3/016 200/600 |
| 8,300,018 | B2* | 10/2012 | Morimoto .............. | A61B 5/447 345/156 |
| 2010/0265208 | A1* | 10/2010 | Kim ....................... | G06F 3/0412 345/174 |

(Continued)

FOREIGN PATENT DOCUMENTS

| | | | | |
|---|---|---|---|---|
| JP | 2009-294140 | | 12/2009 | |
| KR | 20090060877 A | * | 6/2009 | ............. G01L 1/205 |
| KR | 10-2012-0098684 | | 9/2012 | |

*Primary Examiner* — Lisa Caputo
*Assistant Examiner* — Jamel Williams
(74) *Attorney, Agent, or Firm* — NSIP Law

(57) ABSTRACT

An apparatus and method for measuring a tactile information, using a material having variable pressure dependent properties is disclosed. The apparatus for measuring the tactile information may include a plurality of pressure measurement units to measure a magnitude of an external pressure using a material having variable properties, and a tactile information measurement unit to measure a three-dimensional (3D) tactile information based on the external pressure using a location of the plurality of pressure measurement units and a pressure measured by the plurality of pressure measurement units.

24 Claims, 8 Drawing Sheets

(56) References Cited

U.S. PATENT DOCUMENTS

2014/0007700 A1* 1/2014 Lim .................... G01L 1/18
  73/862.68
2014/0318270 A1* 10/2014 Yoneyama ............. B25J 13/083
  73/862.041

* cited by examiner

[CASE 1]

[CASE 2]

[CASE 3]

[CASE 1]

[CASE 2]

APPARATUS AND METHOD FOR MEASURING TACTILE INFORMATION

CROSS-REFERENCE TO RELATED APPLICATIONS

This application claims the priority benefit of Korean Patent Application No. 10-2013-0028396, filed on Mar. 18, 2013, in the Korean Intellectual Property Office, the disclosure of which is incorporated herein by reference.

BACKGROUND

1. Field

Example embodiments relate to an apparatus and method for measuring a tactile information, and more particularly, to an apparatus and method for measuring a tactile information, using a material having variable pressure dependent properties.

2. Description of the Related Art

Technology for measuring a tactile information may refer to technology for measuring properties with respect to an object or an environment through a contact, and may be required for stability of a human or a robot, and a high performance and an intelligent performance of a robot.

To use a tactile sensor for measuring the tactile information in a medical robot, damage to an organ may need to be minimized. Accordingly, the tactile sensor may have a skin-like flexibility, and a surface of the tactile sensor may be configured by a soft and smooth material.

However, a metal strain gauge and a conductive polymer, which are used in a conventional tactile sensor, may have a low reliability of a detected signal and a short longevity, because an invariable transformation may occur when a weight is applied repeatedly. Therefore, using the conventional tactile sensor may be difficult due to low reliability and high longevity.

Accordingly, there is a desire for a tactile sensor with a high reliability and a high longevity.

SUMMARY

In an aspect of one or more embodiments, there is provided an apparatus for measuring a tactile information, the apparatus including a plurality of pressure measurement units to measure a magnitude of an external pressure, using a material having variable pressure dependent properties, and a tactile information measurement unit to measure a three-dimensional (3D) tactile information based on an external pressure, using a location of the plurality of pressure measurement units and a pressure measured by the plurality of pressure measurement units.

The plurality of pressure measurement units may measure a resistance of the material, and measure the magnitude of the external pressure, using the resistance measured.

The plurality of pressure measurement units may determine the magnitude of the external pressure to be proportional to a change in the resistance of the material.

The plurality of pressure measurement units may measure a capacitance of the material, and using the measured capacitance, measure the magnitude of the external pressure.

The plurality of pressure measurement units may determine the magnitude of the external pressure to be inversely proportional to a change in the capacitance of the material.

The material may be a carbon nanotube (CNT)-polymer compound including a CNT in a polymer.

The material may include a force sensitive resistor in which a resistance changes based on a pressure, or a graphene.

The apparatus for measuring the tactile information may further include a pressure providing unit to apply a pressure to at least one of a plurality of pressure measurement units, based on a pressure direction relative to an operation of a user.

In an aspect of one or more embodiments, there is provided a method for measuring a tactile information, the method including measuring, by a plurality of pressure measurement units, a magnitude of an external pressure, using a material having variable pressure dependent properties, and measuring a three-dimensional (3D) tactile information based on the external pressure, using a location of the plurality of pressure measurement units and a pressure measured by the plurality of pressure measurement units.

In an aspect of one or more embodiments, there is provided a method for manufacturing an apparatus for measuring a tactile information, the method including disposing a plurality of electrodes on a substrate, connecting, to the plurality of electrodes, a material having variable pressure dependent properties, and combining, onto the material, a bump for providing a pressure to the material in response to an operation of a user.

In an aspect of one or more embodiments, there is provided an apparatus including a plurality of pressure measurement units to measure a magnitude of an external pressure, using a material having variable pressure dependent properties; and a tactile information measurement unit to generate a three-dimensional (3D) tactile information based on an external pressure, using a location of the plurality of pressure measurement units and a pressure measured by the plurality of pressure measurement units, wherein the at least one of the pressure measurement units includes at least one electrode formed on a substrate, and the material having variable pressure dependent properties contacting the at least one electrode.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
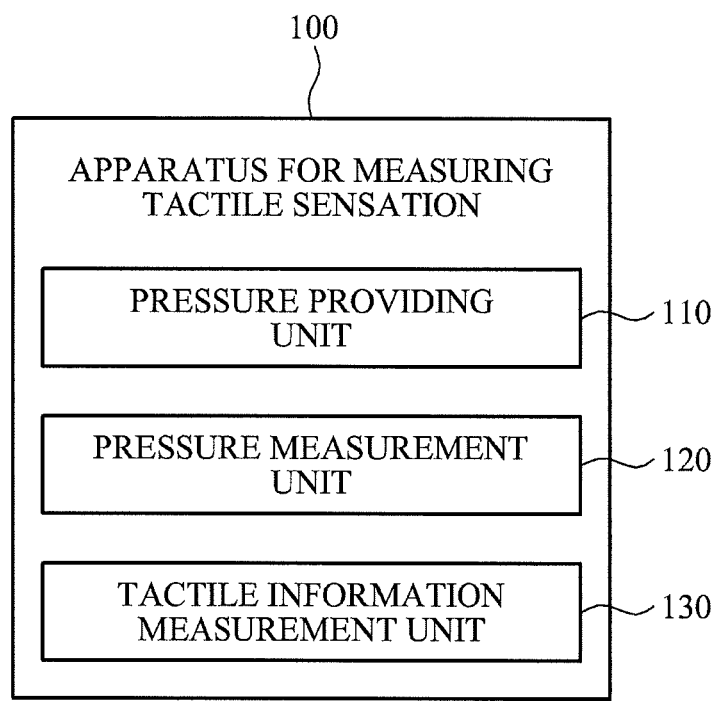
FIG. 1 illustrates a structure of an apparatus for measuring a tactile information according to example embodiments.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates a structure of an apparatus 100 for measuring a tactile information according to example embodiments.

Referring to FIG. 1, the apparatus 100 for measuring the tactile information may include a pressure providing unit 110, a plurality of pressure measurement units 120, and a tactile information measurement unit 130. In FIG. 1, the apparatus 100 for measuring the tactile information may be a tactile sensor.

The pressure providing unit 110 may provide an external pressure to at least one of the plurality of pressure measurement units 120, based on a pressure direction relative to an operation of a user.

In this example, the pressure providing unit 110 may be formed by a polymer having a degree of elasticity and flexibility. For example, the pressure providing unit 110 may be formed by a polymer having an elasticity similar to an elasticity of rubber. Also, the pressure providing unit 110 may refer to a bump formed by an SU-8 photo resist.

The plurality of pressure measurement units 120 may measure a magnitude of an external pressure, using a material having variable pressure dependent properties. For example, a resistance of the material having the variable pressure dependent properties may be changed in proportion to the pressure, or a capacitance of the material having the variable pressure dependent properties may be changed inversely proportional to the pressure.

Accordingly, the plurality of pressure measurement units 120 may measure the resistance of the material having the variable pressure dependent properties, and measure the magnitude of the external pressure using the resistance measured. In this example, the plurality of pressure measurement units 120 may determine the magnitude of the external pressure to be inversely proportional to the change of the resistance of the material having the variable pressure dependent properties.

Also, the plurality of pressure measurement units 120 may measure a capacitance of the material having the variable pressure dependent properties, and using the capacitance measured, measure the magnitude of the external pressure. In this example, the plurality of pressure measurement units 120 may determine the magnitude of the external pressure to be inversely proportional to the change of the capacitance of the material having the variable pressure dependent properties.

The material having the variable pressure dependent properties may be configured by a carbon nanotube (CNT)-polymer compound. As the pressure increases, a CNT included in a polymer may be reduced, thereby increasing a resistance.

Also, the material having the variable pressure dependent properties may include a force sensitive resistor in which a resistance changes based on a pressure, or a graphene.

A configuration of the material having the variable pressure dependent properties will be described with reference to FIG. 3.

The plurality of pressure measurement units 120 may be disposed in a form of array in a lower portion of the pressure providing unit 110.

A detailed configuration of the plurality of pressure measurement units 120 will be described in detail with reference to FIGS. 4 and 5.

The tactile information measurement unit 130 may measure a three-dimensional (3D) tactile information based on an external pressure, using a location of the plurality of pressure measurement units 120 and a pressure measured by the plurality of pressure measurement units 120.

For example, when the plurality of pressure measurement units 120 measures an identical pressure, the tactile information measurement unit 130 may measure an external pressure to be applied by a user in a vertical direction to the pressure providing unit 110. Also, when a portion of the plurality of pressure measurement units 120 measures a relatively higher pressure than a remainder of the plurality of pressure measurement units 120, the tactile information measurement unit 130 may measure a location of the portion of the plurality of pressure measurement units 120, or measure an external pressure to be applied by the user in a direction at which the portion of the plurality of pressure measurement units 120 is located.

Figure 2:
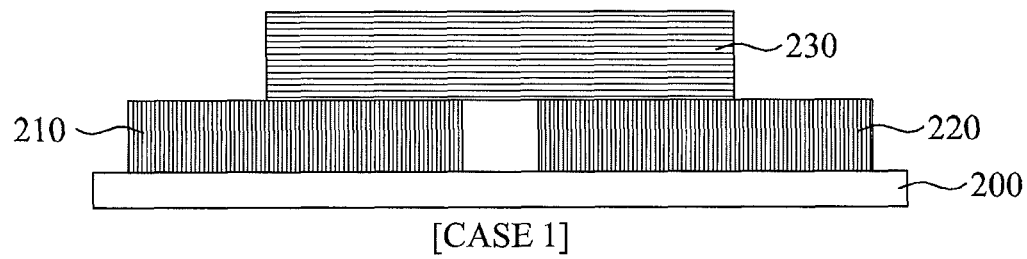
FIG. 2 illustrates an operation of an apparatus for measuring a tactile information according to example embodiments.
Figure 2:
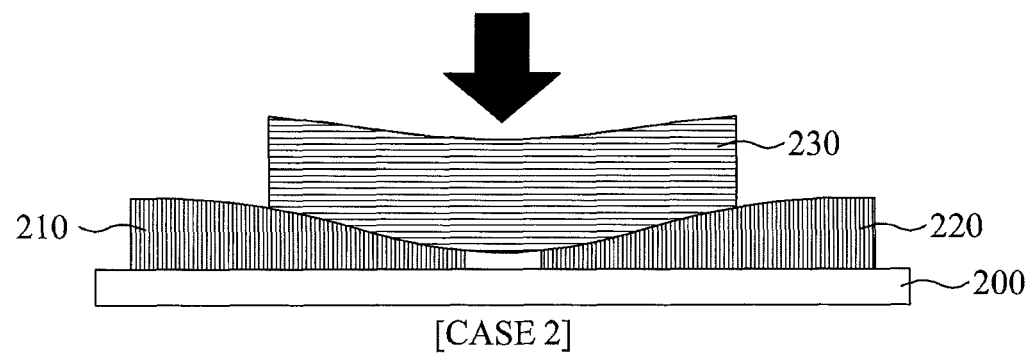
Figure 2:
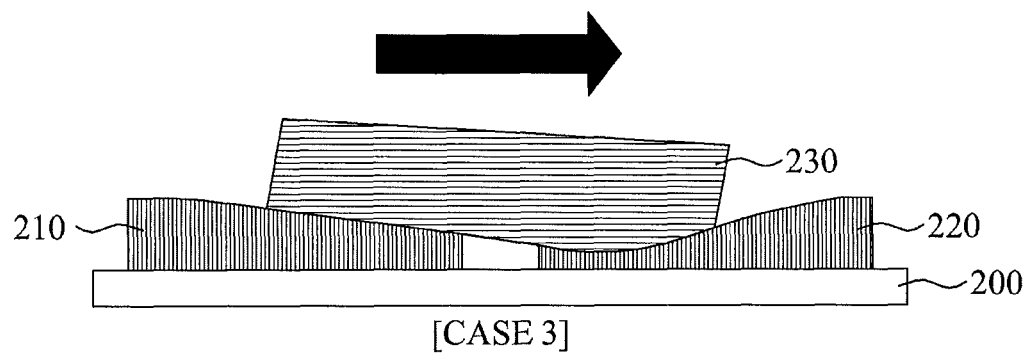

FIG. 2 illustrates an operation of the apparatus 100 for measuring a tactile information according to example embodiments.

The apparatus 100 for measuring the tactile information may include a first material 210, a second material 220, a pressure providing unit 230, and a substrate 200 as shown in FIG. 2.

In FIG. 2, the first material 210 and the second material 220 may refer to a material having variable pressure dependent properties. For example, a resistance of the first material 210 and the second material 220 may change based on a pressure. Also, the substrate 200 may supply a power to the first material 210 and the second material 220, and measure the resistance of the first material 210 and the second material 220 through measuring a power transmitted by the first material 210 and the second material 220.

When the pressure providing unit 230 does not receive a pressure in response to an operation of a user, the resistance of the first material 210 and the second material 220 may be a default value because a transformation due to the pressure may not occur in the first material 210 and the second material 220 as shown in Case 1.

When the pressure providing unit 230 receives a vertical force, for example, a vertical pressure, in response to an operation of a user, a transformation in the first material 210 and the second material 220 may occur in a portion to be contacted by the pressure providing unit 230 as shown in Case 2. In this example, the resistance of the first material 210 and the second material 220 may increase based on the transformation, through the pressure being applied to the corresponding portion.

The tactile information measurement unit 130 may determine that the pressure providing unit 230 receives a vertical force when the resistance of the first material 210 and the second material 220 increases in an identical proportion.

In one or more embodiments, the tactile information measurement unit 130 may measure a magnitude of the vertical force in response to the operation of the user, using a difference between a default value and the increased resistance of the first material 210 and the second material 220 in Case 2, or a ratio between a default value and the increased resistance of the first material 210 and the second material 220 in Case 2.

When the pressure providing unit 230 receives a shearing force, for example, a horizontal pressure moving to a right direction in response to an operation of a user, a transformation of the second material 220 located in a right direction may be greater than a transformation of the first material 210 located in a left direction as shown in Case 3. In this example, the greater the transformation of the first material 210 and the second material 220, the greater the resistance. Accordingly, there may be a greater increase in the resistance of the second material 220 than in the resistance of the first material 210.

In this example, when the resistance change of the first material 210 and the resistance change of the second material 220 differ from one another, the tactile information measurement unit 130 may determine that the pressure providing unit 230 receives a shearing force. In one or more embodiments, the tactile information measurement unit 130 may identify that an increase in the resistance of the second material 220 is greater than the resistance of the first material 210, and determine that the pressure providing unit 230 receives a shearing force moving in a direction of the second material 220.

The tactile information measurement unit 130 may measure a magnitude of the shearing force in response to an operation of a user, using the resistance change of the first material 210 and the resistance change of the second material 220. For example, a relatively minimal difference between the resistance change of the first material 210 and the resistance change of the second material 220 may result in the magnitude of the shearing force of the tactile information measurement unit 130 being measured to be relatively small. Also, when the difference between the resistance change of the first material 210 and the resistance change of the second material 220 is great (large), the magnitude of the shearing force of the tactile information measurement unit 130 may be measured to be great (large).

Figure 3:
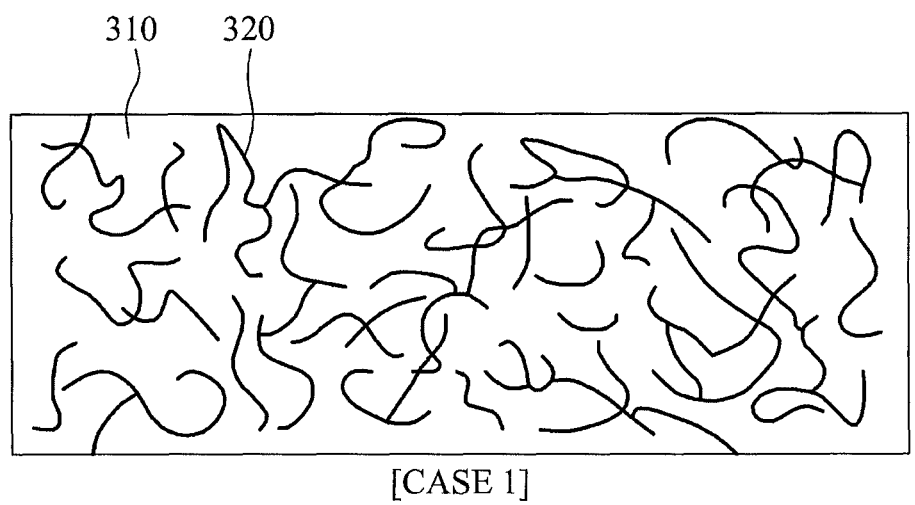
FIG. 3 illustrates a cross-sectional view of a material having variable pressure dependent properties according to example embodiments.
Figure 3:
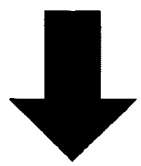
Figure 3:
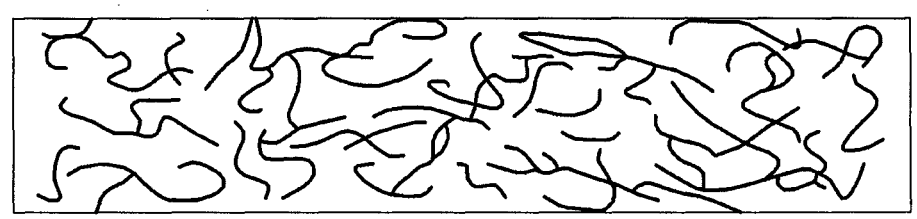

FIG. 3 illustrates a cross-sectional view of a material having variable pressure dependent properties according to example embodiments.

The material having the variable pressure dependent properties may refer to a CNT-polymer compound including a plurality of CNTs 320 in a polymer 310 as shown in FIG. 3. In one or more embodiments, the plurality of CNTs 320 may be bent or tangled due to a high slenderness ratio.

In this example, the CNT-polymer compound may transmit a current inputted from outside through the plurality of CNTs 320 being connected.

When a transformation of the polymer 310 occurs due to an external pressure as shown in Case 2, the plurality of CNTs 320 located in the polymer 310 may be transformed corresponding to the transformation of the polymer 310. For example, an interval between the plurality of CNTs 320 located in a compound to which the external pressure fails to be applied as shown in Case 1 may be greater than a predetermined distance. However, when the external pressure is applied as shown in Case 2, a volume of the polymer 310 may decrease due to the external pressure, and thereby the interval between the plurality of CNTs 320 may decrease. In this example, an electric resistance of the compound may drastically increase due to a high piezoresistive property of the plurality of CNTs 320.

Accordingly, the plurality of pressure measurement units 120 may measure a magnitude of the external pressure applied to the apparatus 100 for measuring the tactile information, using the resistance change of the compound.

The apparatus 100 for measuring the tactile information using a material including the plurality of CNTs 320 may have a higher reliability and longevity as well as a higher detection performance than a conventional apparatus for measuring a tactile information because the plurality of CNTs 320 may have a conductance one thousand times higher and a tensile strength 80 times higher than copper, and may be excellent in terms of flexibility and stability with respect to an environment.

Figure 4:
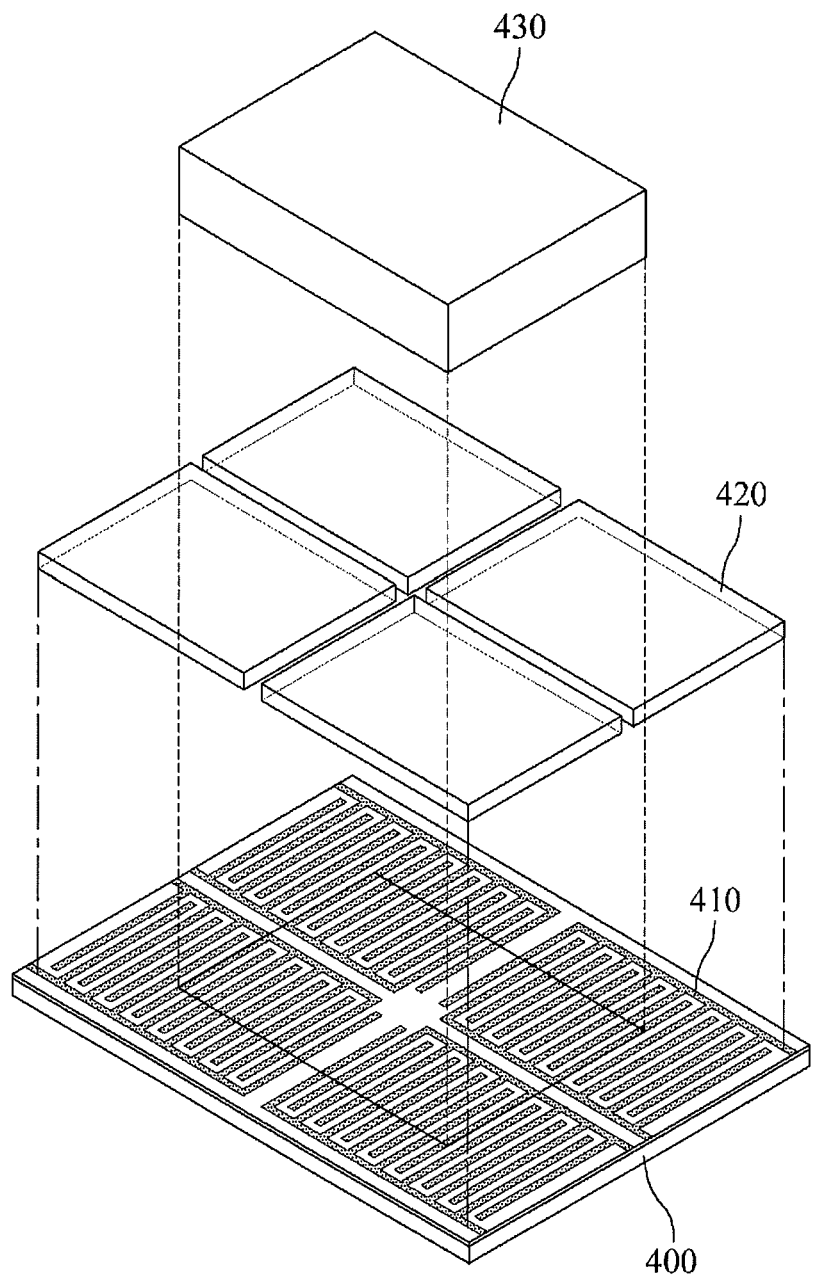
FIG. 4 illustrates an example of an apparatus for measuring a tactile information according to example embodiments.

FIG. 4 illustrates an example of the apparatus 100 for measuring the tactile information according to example embodiments.

The apparatus 100 for measuring the tactile information may include a substrate 400, an electrode 410 formed on the substrate 400, and a plurality of materials 420 having variable pressure dependent properties. A pressure providing unit 430 may be formed on the plurality of materials 420. In this example, the pressure measurement unit 120 may include the plurality of materials 420 and the electrode 410, and may further include a calculation device for measuring a resistance and determining a magnitude of pressure inside or outside the substrate 400.

In one or more embodiments, the electrode 410 may input a power on one side of the plurality of materials 420, and may receive an input of a power transmitted by the plurality of materials 420. The pressure measurement unit 120 may measure a resistance of the plurality of materials 420 by comparing the power transmitted by the plurality of materials 420 and the power inputted to the plurality of materials 420 by the electrode 410, and determine a magnitude of an external pressure provided to the plurality of materials 420 by the pressure providing unit 430, using the resistance measured.

Figure 5:
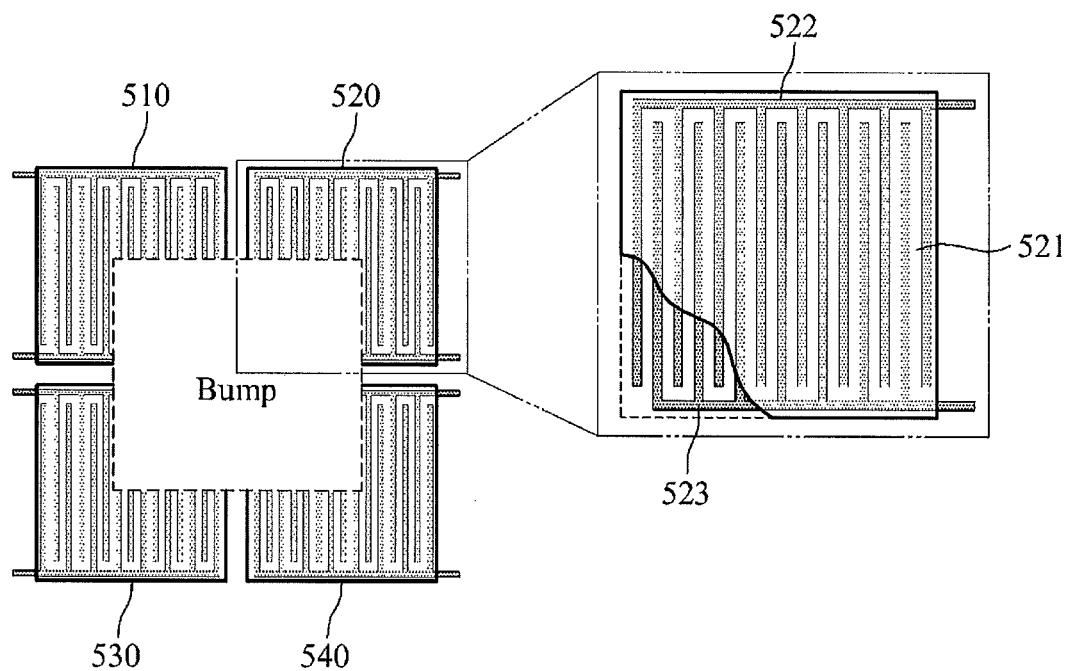
FIG. 5 illustrates a top view of an example of an apparatus for measuring a tactile information according to example embodiments.

FIG. 5 illustrates a top view of an example of the apparatus 100 for measuring the tactile information according to example embodiments.

The apparatus 100 for measuring the tactile information may include a first pressure measurement unit S1 510, a second pressure measurement unit S2 520, a third pressure measurement unit S3 530, and a fourth pressure measurement unit S4 540, and a bump, for example, the pressure providing unit 110, may be formed in a center of the plurality of pressure measurement units S1 510 through S4 540 as shown in FIG. 5.

In this example, the first pressure measurement unit S1 510, the second pressure measurement unit S2 520, the third pressure measurement unit S3 530, and the fourth pressure measurement unit S4 540 may include a material 521 having variable pressure dependent properties, a first electrode 522 supplying a power to the material 521, and a second electrode 523 receiving an input of a power transmitted by the material 521.

The first pressure measurement unit S1 510, the second pressure measurement unit S2 520, the third pressure measurement unit S3 530, and the fourth pressure measurement unit S4 540 may enable the tactile information measurement unit 130 to measure a direction, a type, a location of a pressure by measuring a pressure provided by the pressure providing unit 110.

For example, the tactile information measurement unit 130 may measure a direction or a type of a pressure, using Table 1.

TABLE 1

| DIRECTION OF FORCE | | CHANGE OF ELECTRIC RESISTANCE | | | |
|---|---|---|---|---|---|
| | | S1 | S2 | S3 | S4 |
| SHEARING FORCE | +x | ~ | + | ~ | + |
| | −x | + | ~ | + | ~ |
| | +y | + | + | ~ | ~ |
| | −y | ~ | ~ | + | + |
| VERTICAL FORCE | z | + | + | + | + |

More particularly, when a bump receives a vertical force in response to an operation of a user, resistances may increase as all of the first pressure measurement unit S1 510, the second pressure measurement unit S2 520, the third pressure measurement unit S3 530, and the fourth pressure measurement unit S4 540 is compressed as shown in Case 2 of FIG. 2.

Accordingly, the tactile information measurement unit 130 may determine that the bump receives the vertical force when the resistances of the first pressure measurement unit S1 510, the second pressure measurement unit S2 520, the third pressure measurement unit S3 530, and the fourth pressure measurement unit S4 540 all increase. In this example, the tactile information measurement unit 130 may measure a magnitude of the vertical force, using the increased resistance or a ratio of the electric resistance.

When the bump receives a shearing force in a direction of a positive (+) x axis in response to an operation of a user, the second pressure measurement unit S2 520 and the fourth pressure measurement unit S4 540 corresponding to a direction of force may be compressed to a great degree as shown in Case 3 of FIG. 2, and the first pressure measurement unit S1 510 and the third pressure measurement unit S3 530 may be compressed to a small degree.

Accordingly, the tactile information measurement unit 130 may determine that the bump receives the shearing force in the direction of the positive (+) x axis when only the electric resistances of the second pressure measurement unit S2 520 and the fourth pressure measurement unit S4 540 increase, as shown in Table 1.

Also, when the user presses an upper right portion of the bump, a pressure measured by the second pressure measurement unit S2 520 may be greater than a pressure measured by the first pressure measurement unit S1 510, the third pressure measurement unit S3 530, and the fourth pressure measurement unit S4 540. Accordingly, the tactile information measurement unit 130 may determine that the user presses the upper right portion of the bump at which the second pressure measurement unit S2 520 is located.

Figure 6:
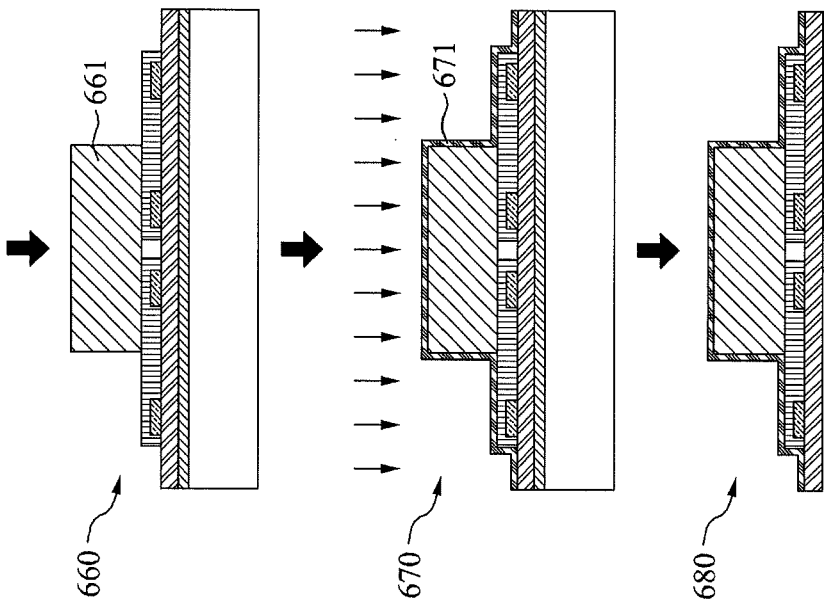
FIG. 6 illustrates a process of manufacturing an apparatus for measuring a tactile information according to example embodiments.
Figure 6:
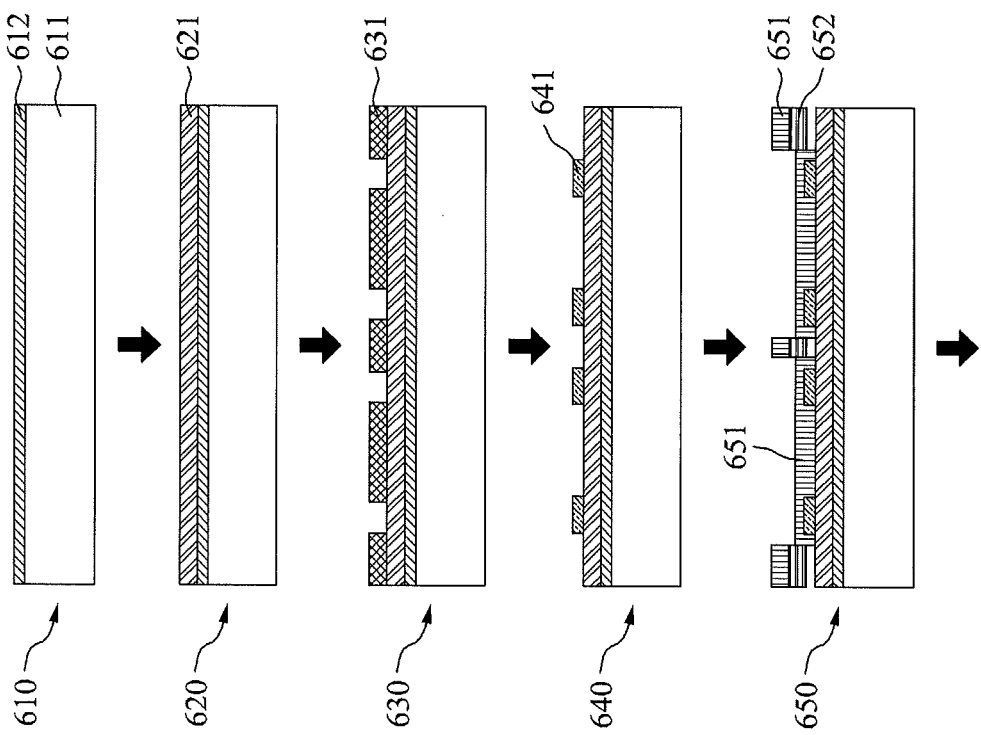

FIG. 6 illustrates a process of manufacturing an apparatus for measuring a tactile information according to example embodiments.

In operation 610, an apparatus for manufacturing the apparatus for measuring the tactile information may select a silicon dioxide ($SiO_2$)/silicon (Si) substrate in which an $SiO_2$ 612 is doped on an Si 611.

In operation 620, the apparatus for manufacturing the apparatus for measuring may spin coat a polyimide 621 on the $SiO_2$/Si substrate selected in operation 610.

In operation 630, the apparatus for manufacturing the apparatus for measuring may pattern a form of an electrode on the polyimide 621 spin coated in operation 620. For example, the apparatus for manufacturing the apparatus for measuring may pattern the form of the electrode through attaching photo resists 631 on the polyimide 621 through a photolithography process.

In operation 640, the apparatus for manufacturing the apparatus for measuring may deposit an electrode material between the photo resists 631 patterned in operation 630. The apparatus for manufacturing the apparatus for measuring may form an electrode 641 by removing the photo resists 631. For example, the electrode material may be gold (Au).

In operation 650, the apparatus for manufacturing the apparatus for measuring may combine a CNT-polymer compound 651 onto the electrode 641 formed in operation 610. For example, the apparatus for manufacturing the apparatus for measuring may screen print the CNT-polymer compound 651 on the electrode 641. Also, the CNT-polymer compound 651 may be a material formed in a structure as in FIG. 3.

In this example, the apparatus for manufacturing the apparatus for measuring may attach a screen mask 652 at a boundary between the plurality of pressure measurement units 120, or at an exterior angle of the apparatus 100 for measuring the tactile information, and then combine the CNT-polymer compound 651.

The apparatus for manufacturing the apparatus for measuring may combine the CNT-polymer compound 651 in one unit among the plurality of pressure measurement units 120 by removing the screen mask 652.

In operation 660, the apparatus for manufacturing the apparatus for measuring may manufacture the apparatus 100 for measuring the tactile information through combining a bump 661 onto the CNT-polymer compound 651 combined in operation 650. In one or more embodiments, the bump 661 may be the pressure providing unit 110 formed by an SU-8 photo resist.

In operation 670, the apparatus for manufacturing the apparatus for measuring may coat a parylene 671 on the apparatus 100 for measuring the tactile information manufactured in operation 660. In this example, the parylene 671 may protect the CNT-polymer compound 651 from an external effect, aside from a pressure. For example, when the apparatus for measuring the tactile information is manufactured for use in a position in which the external effect is insignificant, operation 670 may be omitted.

In operation 680, the apparatus for manufacturing the apparatus for measuring may separate the apparatus 100 for measuring the tactile information on which the parylene 671 is coated in operation 670 from the $SiO_2$/Si substrate.

When the polyimide 621 in a fixed form is present, the apparatus for manufacturing the apparatus for measuring may omit operations 610 and 680.

Figure 7:
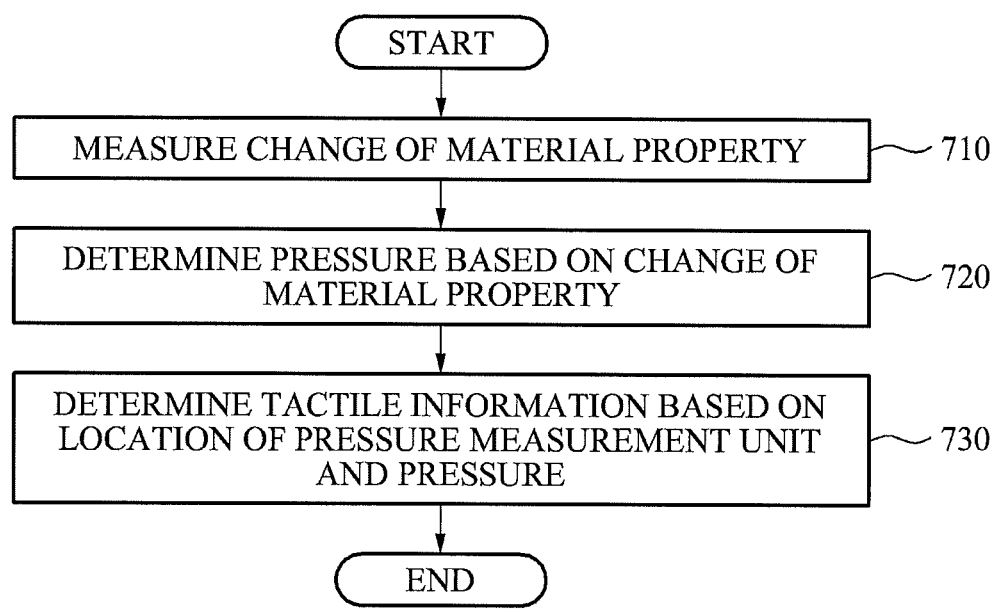
FIG. 7 illustrates an operation of an apparatus for measuring a tactile information according to example embodiments.

FIG. 7 illustrates an operation of an apparatus for measuring a tactile information according to example embodiments.

In operation 710, the plurality of pressure measurement units 120 may measure a change in properties of a material. In one or more embodiments, the material may refer to a material having variable pressure dependent properties.

For example, the plurality of the pressure measurement units 120 may input a power on one side of the material having the variable pressure dependent properties, and may measure a resistance of the material having the variable pressure dependent properties by measuring a power transmitted by the material having the variable pressure dependent properties.

In operation 720, the plurality of pressure measurement units 120 may determine a magnitude of an external pressure applied to the material having the variable pressure dependent properties, using the resistance measured in operation 710. In one or more embodiments, the plurality of pressure measurement units 120 may determine the magnitude of the pressure applied to the material in proportion to the change in the resistance measured in operation 710.

In operation 730, the tactile information measurement unit 130 may measure a 3D tactile information based on an external pressure, using a location of the plurality of pressure measurement units 120 of which a pressure is measured in operation 720, and the pressure measured by the plurality of pressure measurement units 120.

For example, the tactile information measurement unit 130 may determine that a user applies a pressure in a vertical direction to the pressure providing unit 110 when the plurality of pressure measurement units 120 measures an identical pressure. Also, the tactile information measurement unit 130 may determine that the user applies a pressure to a location of a portion of the plurality of pressure measurement units 120 or in a direction at which the portion of the plurality of pressure measurement units 120 is located when the portion of the plurality of pressure measurement units 120 measures a higher pressure than remaining units among the plurality of pressure measurement units 120.

Figure 8:
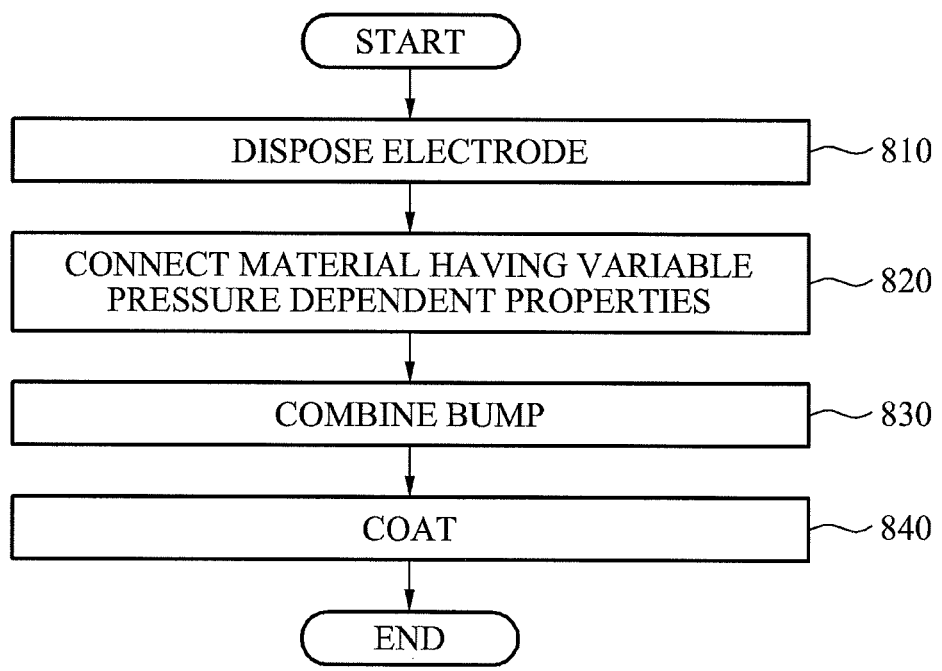
FIG. 8 illustrates a method for manufacturing an apparatus for measuring a tactile information according to example embodiments.

FIG. 8 illustrates a method for manufacturing an apparatus for measuring a tactile information according to example embodiments.

In operation 810, an apparatus for manufacturing an apparatus for measuring a tactile information may dispose an electrode on a substrate.

More particularly, the apparatus for manufacturing an apparatus for measuring a tactile information may pattern a form of an electrode on a polyimide. For example, the apparatus for manufacturing an apparatus for measuring a tactile information may pattern the form of the electrode through attaching photo resists on the polyimide through a photolithography process.

The apparatus for manufacturing an apparatus for measuring a tactile information may deposit an electrode material between the photo resists attached. The apparatus for manufacturing an apparatus for measuring a tactile information may form the electrode 641 through removing the photo resists. For example, the electrode material may be Au.

In operation 820, the apparatus for manufacturing an apparatus for measuring a tactile information may connect a material having variable pressure dependent properties to the electrode disposed in operation 810.

For example, the apparatus for manufacturing an apparatus for measuring a tactile information may screen print a CNT-polymer compound onto the electrode disposed in operation 810.

In one or more embodiments, the apparatus for manufacturing an apparatus for measuring a tactile information may attach a screen mask at a boundary between the plurality of pressure measurement units, or at an exterior angle of the tactile information measurement unit in order to distinguish the plurality of pressure measurement units, and combine the CNT-polymer compound.

The apparatus for manufacturing an apparatus for measuring a tactile information may combine the CNT-polymer compound in a unit of the plurality of the pressure measurement units 120 by removing the screen mask.

In operation 830, the apparatus for manufacturing an apparatus for measuring a tactile information may combine a bump onto the material. In one or more embodiments, the bump may be a configuration in which a pressure is applied to a material having variable pressure dependent properties, in response to an operation of a user. For example, the bump may refer to the pressure providing unit 110 formed by an SU-8 photo resist.

In operation 840, the apparatus for manufacturing an apparatus for measuring a tactile information may coat the parylene 671 on the material connected in operation 820 and on the bump formed in operation 830. In one or more embodiments, the parylene 671 may protect the material connected in operation 820 from an external effect, aside from a pressure.

A portable device as used throughout the present specification includes mobile communication devices, such as a personal digital cellular (PDC) phone, a personal communication service (PCS) phone, a personal handy-phone system (PHS) phone, a Code Division Multiple Access (CDMA)-2000 (1×, 3×) phone, a Wideband CDMA phone, a dual band/dual mode phone, a Global System for Mobile Communications (GSM) phone, a mobile broadband system (MBS) phone, a satellite/terrestrial Digital Multimedia Broadcasting (DMB) phone, a Smart phone, a cellular phone, a personal digital assistant (PDA), an MP3 player, a portable media player (PMP), an automotive navigation system (for example, a global positioning system), and the like. Also, the portable device as used throughout the present specification includes a digital camera, a plasma display panel, and the like.

The method for measuring the tactile information according to the above-described embodiments may be recorded in non-transitory computer-readable media including program instructions (computer readable instructions) to implement various operations embodied by a computer to cause one or more processors to execute or perform the program instructions. A portable device is an example of a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules that are recorded, stored, or fixed in one or more non-transitory computer-readable storage media in order to perform the operations of the above-described embodiments, or vice versa. In addition, one or more non-transitory computer-readable storage media may be distributed among computers connected through a network and computer-readable codes or program instructions may be stored and executed in a decentralized manner. A computer may be any device including one or more processors. In addition, the non-transitory computer-readable storage media may also be embodied in at least one application specific integrated circuit (ASIC) or Field Programmable Gate Array (FPGA).

Although embodiments have been shown and described, it would be appreciated by those skilled in the art that changes may be made in these embodiments without departing from the principles and spirit of the disclosure, the scope of which is defined by the claims and their equivalents.

What is claimed is:

1. An apparatus for measuring a tactile information, the apparatus comprising:
    pressure measurement units configured to measure a magnitude of an external pressure, using a material having variable pressure dependent properties; and
    a tactile information measurement unit configured to measure a three-dimensional (3D) tactile information based on an external pressure, using a location of the pressure measurement units and a pressure measured by the pressure measurement units, wherein the pressure measurement units determine the magnitude of the external pressure to be inversely proportional to a change in a capacitance of the material.

2. The apparatus of claim 1, wherein the pressure measurement units measure a resistance of the material, and measure the magnitude of the external pressure, using the resistance measured.

3. The apparatus of claim 2, wherein the pressure measurement units determine the magnitude of the external pressure to be proportional to a change in the resistance of the material.

4. The apparatus of claim 1, wherein the material is a carbon nanotube (CNT)-polymer compound including a CNT in a polymer.

5. The apparatus of claim 1, wherein the material includes a force sensitive resistor in which a resistance changes based on a pressure, or a graphene.

6. The apparatus of claim 1, further comprising:
a pressure providing unit configured to apply a pressure to pressure measurement units, based on a pressure direction relative to an operation of a user.

7. The apparatus of claim 6, wherein the pressure measurement units are disposed in a form of an array in a lower portion of the pressure providing unit.

8. A method for measuring a tactile information, the method comprising:
measuring, by pressure measurement units, a magnitude of an external pressure, using a material having variable pressure dependent properties;
measuring the magnitude of the external pressure applied to the material having the variable properties based on the external pressure, inversely proportional to a capacitance of the material having the variable properties based on the external pressure; and
measuring a three-dimensional (3D) tactile information based on the external pressure, using a location of the pressure measurement units and a external pressure measured by the pressure measurement units.

9. The method of claim 8, wherein the measuring of the magnitude of the external pressure comprises:
measuring the magnitude of the pressure applied to the material having the variable properties based on the pressure, in proportion to a resistance of the material having the variable properties based on the pressure.

10. A method for manufacturing an apparatus for measuring a tactile information, the method comprising:
disposing electrodes on a substrate;
connecting, to the electrodes, a material having variable pressure dependent properties; and
combining, onto the material, a bump for providing a pressure to the material in response to an operation of a user, wherein a resistance of the material changes in proportion to a pressure, and a capacitance of the material changes inversely proportional to a pressure.

11. The method of claim 10, wherein the material is a carbon-nanotube (CNT)-polymer compound including a CNT in a polymer.

12. The method of claim 10, wherein the material comprises a force sensitive resistor in which a resistance changes based on a pressure, or a graphene.

13. The apparatus of claim 1, wherein the magnitude of the external pressure uses a difference between a default value and an increased resistance of the material.

14. The apparatus of claim 1, wherein the magnitude of the external pressure uses a ratio between a default value and an increased resistance of the material.

15. An apparatus for measuring a tactile information, the apparatus comprising:
pressure measurement units configured to measure a magnitude of an external pressure, using a material having variable pressure dependent properties; and
a tactile information measurement unit configured to generate a three-dimensional (3D) tactile information based on an external pressure, using a location of the pressure measurement units and a pressure measured by the pressure measurement units,
wherein the pressure measurement units comprise
one electrode formed on a substrate; and
the material having variable pressure dependent properties contacting the electrode, wherein the material includes a force sensitive resistor in which a resistance changes based on a pressure, or a graphene.

16. The apparatus of claim 15, wherein the electrode comprises a first electrode configured to receive an input of power from a power supply in order to supply power to the material, and a second electrode configured to receive power transmitted from the material.

17. The apparatus of claim 15, wherein the three-dimensional (3D) tactile information includes a direction of pressure, a type of pressure, and a location of pressure.

18. The apparatus of claim 15, wherein the magnitude of the external pressure uses a difference between a default value and an increased resistance of the material.

19. The apparatus of claim 15, wherein the magnitude of the external pressure uses a ratio between a default value and an increased resistance of the material.

20. The apparatus of claim 15, wherein the material is a carbon nanotube (CNT)-polymer compound including a CNT in a polymer.

21. The apparatus of claim 15, further comprising:
a pressure providing unit configured to apply a pressure to pressure measurement units, based on a pressure direction relative to an operation of a user.

22. The apparatus of claim 21, wherein the pressure measurement units are disposed in a form of an array in a lower portion of the pressure providing unit.

23. The apparatus of claim 1, wherein the apparatus is installed in a portable device.

24. The apparatus of claim 15, wherein the apparatus is installed in a portable device.

* * * * *